United States Patent Office 3,030,709
Patented Apr. 24, 1962

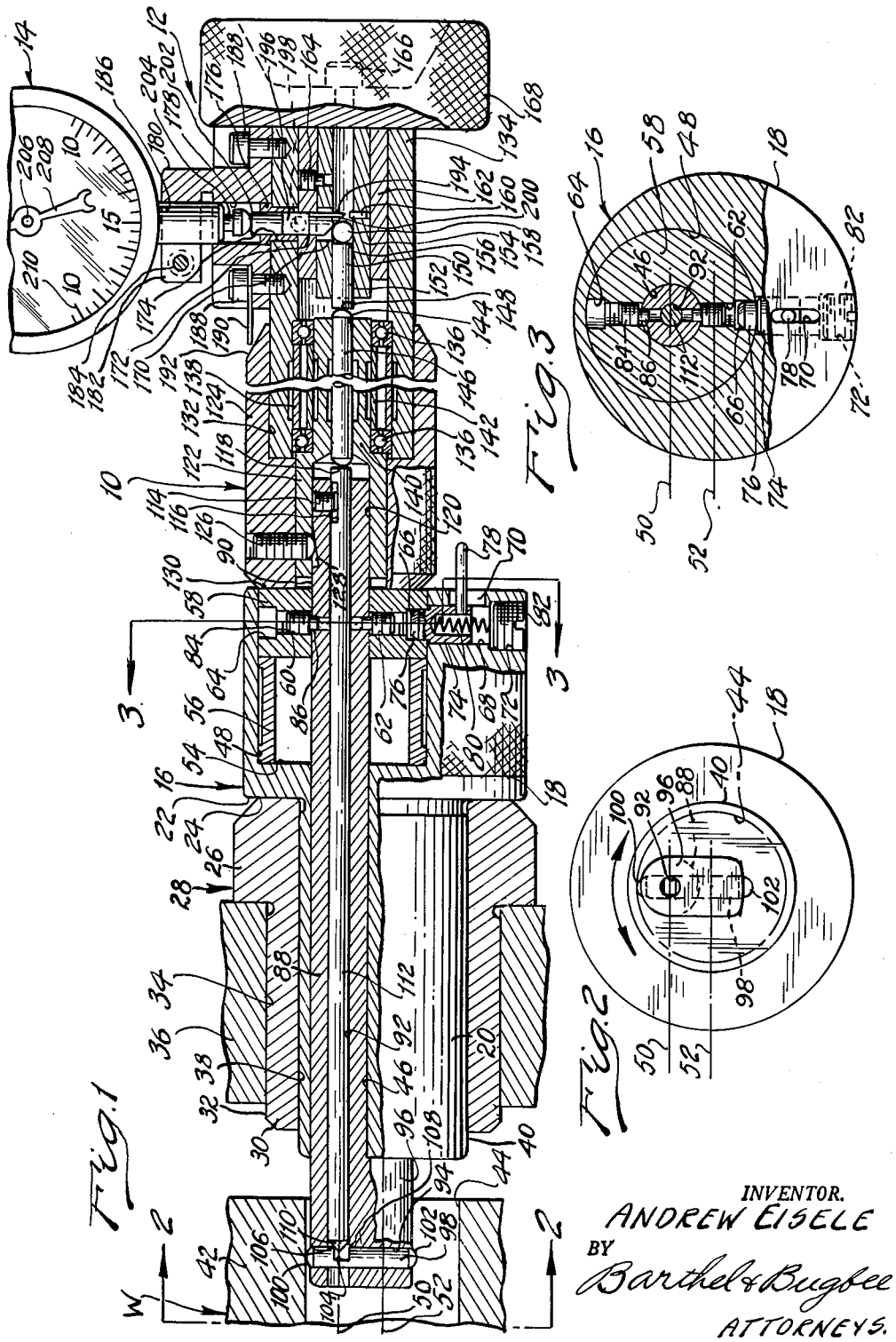

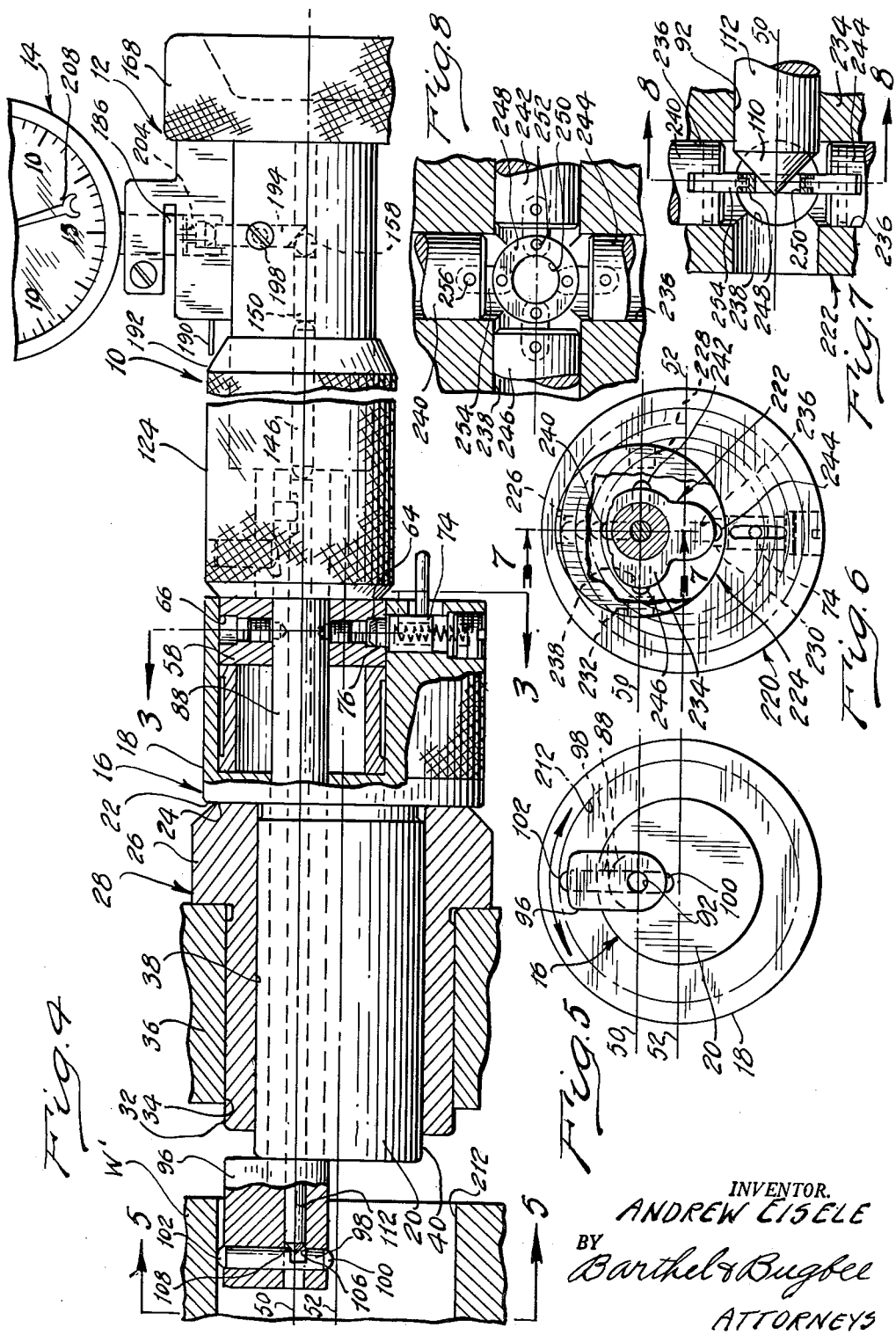

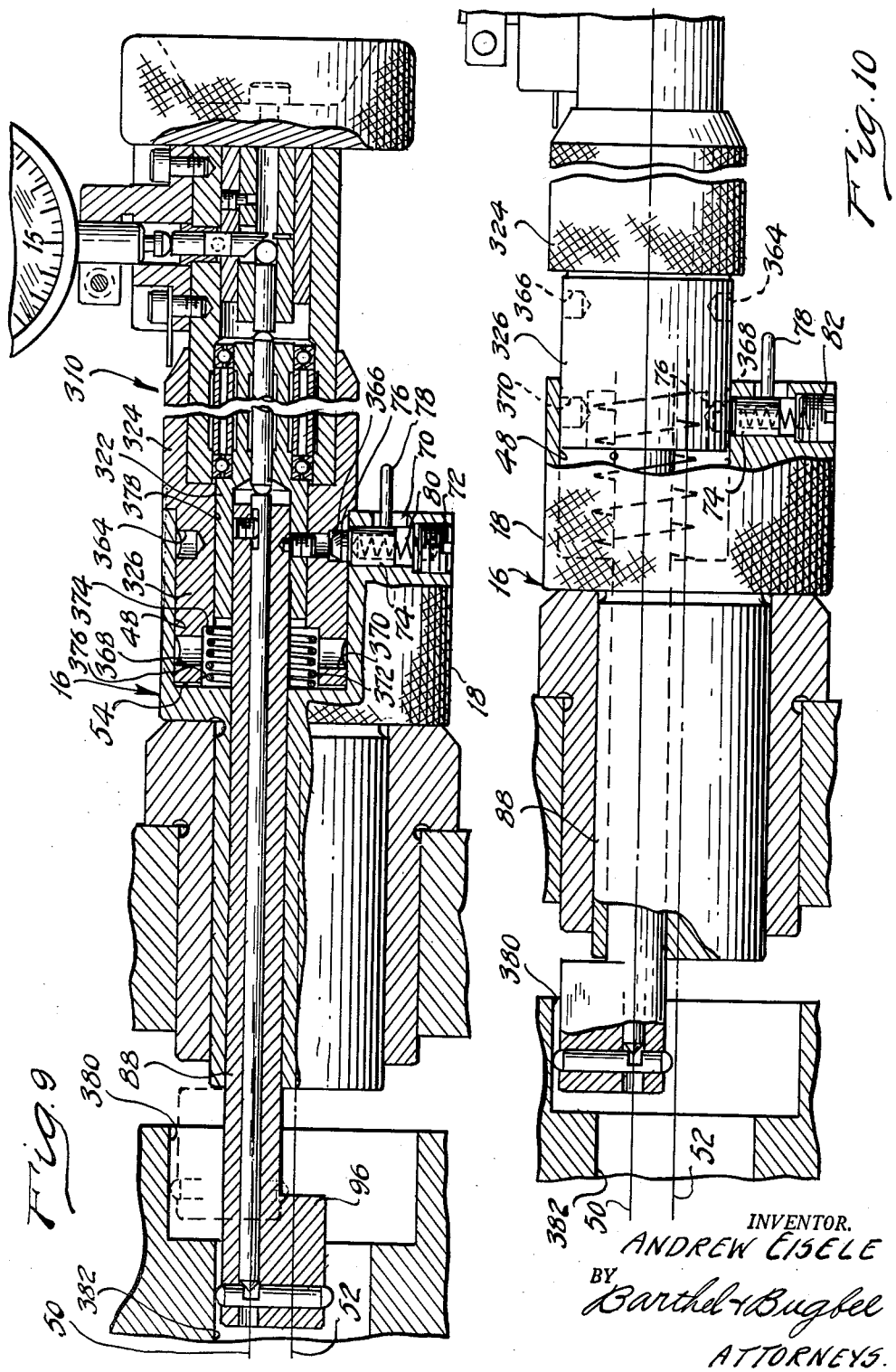

3,030,709
BORE CONCENTRICITY GAUGE
Andrew Eisele, 459 Belton Ave., Garden City, Mich.
Filed Jan. 11, 1960, Ser. No. 1,657
12 Claims. (Cl. 33—174)

This invention relates to precision bore gauges and, in particular, to bore concentricity gauges.

One object of this invention is to provide a bore concentricity gauge which is so constructed and arranged as to be capable of measuring the accuracy of concentricity of a bore of one diameter or range of diameters in a workpiece with respect to a reference bore or related bore, and which by a simple manipulation of the bore gauge can also be quickly and easily converted to measure the concentricity of another bore of a substantially different diameter or range of diameters.

Another object is to provide a bore concentricity gauge of the foregoing character having releasable locking mechanism for releasably locking the bore gauge temporarily in either position for measuring either diameter or range of diameters.

Another object is to provide a modified bore concentricity gauge of the foregoing general character which is adapted to be shifted into several different positions for the measurement of bores of several different diameters or ranges of diameters.

Another object is to provide a further modified bore concentricity gauge of the foregoing general character which is shiftable longitudinally relatively to its mount into axially-spaced locations in order to measure the concentricity of stepped bores or of a series of bores of different diameters or diameter ranges located at different axial distances from a reference abutment surface which the mount of the bore gauge contacts.

Other objects and advantages of the invention will become apparent during the course of the following description of the accompanying drawings, wherein:

FIGURE 1 is a central longitudinal section, partly in side elevation, through a dual-diameter bore concentricity gauge, according to one form of the invention, set for the measurement of a relatively small diameter;

FIGURE 2 is a left-hand end elevation in the direction 2—2 in FIGURE 1, with the workpiece omitted but its bore shown in dotted lines;

FIGURE 3 is a cross-section taken along the line 3—3 in FIGURE 1;

FIGURE 4 is a view similar to FIGURE 1, but showing the bore gauge shifted to a different position for the measurement of a relatively large diameter;

FIGURE 5 is a left-hand end elevation in the direction of 5—5 in FIGURE 4, with the workpiece omitted but its bore shown in dotted lines;

FIGURE 6 is a cross-section similar to FIGURE 3, but with the indexing collar broken away to show a modified measuring head for a multi-diameter bore concentricity gauge enabling measurement of four different diameters or diameter ranges;

FIGURE 7 is an enlarged fragmentary longitudinal section taken along the line 7—7 in FIGURE 6, showing one motion-transmitting arrangement between the measuring pins or feelers of FIGURE 6;

FIGURE 8 is an enlarged fragmentary cross-section taken along the line 8—8 in FIGURE 7;

FIGURE 9 is a central longitudinal section, partly in side elevation, through a further modified axially-extensible bore concentricity gauge adapted to measure bores of different diameters or diameter ranges located at different axial distances from a reference abutment surface which the bore gauge mount contacts, with the gauge set for the measurement of a relatively small diameter bore; and FIGURE 10 is a view similar to FIGURE 9, but mainly in side elevation and with portions omitted to conserve space, showing the bore gauge of FIGURE 9 shifted to a different location for the measurement of a relatively larger bore located at a different axial distance from the reference abutment surface.

Dual Diameter Bore Concentricity Gauge

Referring to the drawings in detail, FIGURES 1 to 5 inclusive show a bore concentricity gauge, generally designated 10, which is shiftable to the measurement of bores of different diameters or ranges of diameters, according to one form of the invention. The bore concentricity gauge 10 consists generally of an elongated measuring unit 12 which at its rearward end carries a conventional dial indicator 14, and which is rotatably mounted eccentrically within a gauge mount, generally designated 16, and indexed relatively thereto into a plurality of measuring divisions, as explained below. The gauge mount 16 in turn has an enlarged diameter portion 18 and a reduced diameter portion 20 with a radial annular shoulder 22 therebetween serving as an abutment surface or stop surface engageable with a corresponding annular radial abutment surface 24 upon the end of the enlarged diameter portion 26 of an adapter sleeve or fixture 28.

The adapter sleeve 28 has a reduced diameter portion 30 with a cylindrical external surface 32 which snugly but slidably engages a bore 34 in a supporting structure 36. The adapter sleeve 28 has a cylindrical bore 38 coaxial with the external surface 32 on the reduced diameter portion 30, and this in turn snugly but slidably engages the cylindrical outer surface 40 upon the reduced diameter portion 20 of the gauge mount. Also associated with the supporting structure 36 in a temporarily fixed relationship thereto is a portion 42 of a workpiece W having a bore 44, the concentricity of which is to be measured relatively to the bore 34 in the supporting structure 36.

The gauge mount 16 (FIGURE 1) is provided with a bore 46 and enlarged counterbore 48 having a common axis 50 with one another which is eccentric or radially offset relatively to the axis 52 of the mount 16. Mounted in the counterbore 48 against the annular shoulder 54 between it and the eccentric bore 46 is a spacer sleeve 56, the opposite end of which is engaged by an indexing collar 58. The indexing collar 58 is provided with diametrically opposite radial threaded bores 60 and 62, the outer ends of which open into enlarged counterbores 64 and 66 which serve as indexing sockets in the manner explained below. The gauge mount 16 in its enlarged diameter portion 18 is provided with a radial bore 68 having a slot 70 extending radially outward through the end wall of the enlarged portion 18. The bore 68 terminates at its outer end in an enlarged threaded counterbore 72. Reciprocably mounted within the bore 68 (FIGURES 1 and 3) is a hollow plunger 74, the reduced diameter inner end 76 of which snugly and selectively engages either of the indexing sockets 64 or 66 as the indexing collar 58 is rotated through a half revolution as described below. The plunger 74 is bored radially to receive a pin or handle 78 which projects outward through the slot 70 into a position where it may be engaged by the fingertip of the operator. The plunger 74 is constantly urged inward by a compression spring 80 mounted in its hollow interior with its opposite end seated in the cupped inner end of a screw plug 82 threaded into the counterbore 72.

Threaded into the threaded bores 60 and 62 are headless set screws 84, the reduced diameter inner ends of which snugly engage diametrically opposite sockets 86 in a rotary tubular stem 88 which has an external cylindrical surface 90 which is snugly but rotatably mounted in the bore 46 of the gauge mount 16. The stem 88 is provided with a central bore 92 therethrough and at its outer end opens into a cross-bore 94 in an enlarged offset measuring head 96. The measuring head 96 is offset laterally or radially relatively to the axis of the bore 92 and stem 88.

Snugly but reciprocably mounted in the cross bore 94, the axis of which is perpendicular to the axis of the bore 92, is a measuring pin or feeler 98 having partially spherical opposite ends 100 and 102 respectively. The measuring pin 90 at a location slightly to one side of its midpoint is provided with a transverse notch 104 of rectangular cross-section which is precisely ground so as to produce sharp or substantially knife-edged opposite edges 106 and 108 respectively. Engageable with either of the knife edges 106 or 108, depending upon the position of the head 96, whether for small diameter measurement (FIGURE 1) or large diameter measurement (FIGURE 4), is the precisely ground conical end portion 110 of an outer motion-transmitting rod 112. The conical end portion 110 is preferably disposed at an angle of 45 degrees with the axis 50 of the bore 92 and motion-transmitting rod 112, which is snugly but reciprocably mounted in the bore 92. The stem 88 is drilled and threaded radially to receive a headless set screw 114 (FIGURE 1), the end of which engages an elongated flat-bottomed recess 116 on the inner end portion of the rod 112 remote from its conical outer end portion 110. The rod 112 has a substantially flat inner end 118 located near the flat-bottomed recess 116.

The inner end portion of the stem 8 is snugly but removably inserted in a cylindrical socket or counterbore 120 in the outer end portion of a rotary inner sleeve 122. Mounted on the rotary inner sleeve 122 is an outer tubular barrel 124 which is preferably knurled for ease of grasping. The barrel 124 is drilled and threaded radially to receive a set screw 126, the inner end portion of which passes through the radially-drilled sleeve 122 and engages an axially-inclined flat-bottomed recess 128 in the inner end portion of the stem 88 to prevent relative rotation between the tubular barrel 124, sleeve 122 and stem 88. The forward radial annular end surface 130 of the barrel 124 abuts against the indexing collar 58 while the rearward end portion is provided with an enlarged counterbore 132 (FIGURE 1). Mounted in the counterbore 132 is a tubular member or tubular support 134 which is counterbored to receive the outer races of two axially-spaced anti-friction bearing assemblies 136 spaced apart from one another by an outer spacing sleeve 138. The inner races of the anti-friction bearing assemblies 136 are mounted upon the reduced diameter portion 140 of the sleeve 122 and spaced apart from one another by an inner spacing sleeve 142.

The reduced diameter end portion 140 of the sleeve 122 is provided with a central bore 144 which snugly but reciprocably receives an intermediate round-ended motion-transmitting pin 146 engageable at its outer end with the flat end 118 of the outer motion-transmitting rod 112. The rounded inner end of the intermediate motion-transmitting rod 146 engages the substantially flat outer end 148 of an inner motion-transmitting rod 150 snugly but reciprocably mounted in a bore 152 within a sleeve 154 (FIGURE 1). The bore 152 and the inner motion-transmitting rod 150 are coaxial with the intermediate motion-transmitting rod 146 and its bore 144, and also coaxial with the outer motion-transmitting rod 112 and its bore 92.

The inner motion-transmitting rod 150 (FIGURE 1) is provided with a substantially flat inner end 156 which engages a precisely-ground hardened ball 158 mounted in the bore 152, the sleeve 154 being drilled adjacent the ball 158 on the opposite side thereof from the flat rod end 156 to receive a retaining pin 160. The sleeve 154 is mounted in a sleeve 162, both being drilled in alignment and the sleeve 162 threaded to receive a headless set screw 164. The sleeve 162 is in turn mounted in the sleeve 134, which is drilled and threaded at diametrically-opposite locations to receive a pair of cap screws 166 by which a similarly-drilled knurled handle 168 is operatively secured to the sleeve 134.

The sleeves 154, 162 and 134 are provided with aligned coaxial transverse bores 170, 172 and 174, the bores 170 and 174 being of larger diameter than the bore 172. The bore 170 opens into the longitudinal bore 152 adjacent the ball 158 and retaining pin 160. A flanged bearing bushing 176 is inserted in the bore 174 and has its flange seated in a bore 178 in a dial indicator mounting bracket 180 having a slotted arm 182 drilled and threaded to receive a clamping screw 184 by which the tubular stem 186 of the dial indicator 14 is secured in the bracket 180. The bracket 180 is drilled in axially-spaced locations and the sleeve 134 drilled and threaded in alignment therewith to receive screws 188 by which the bracket 180 is fastened to the sleeve 134. A pointer 190 mounted beneath the head of the forward screw 188 registers with marks or other indicia upon the bevelled surface 192 to indicate the relative positions of the outer tubular barrel 124 with respect to the pointer 190.

Reciprocably mounted in the bores 170 and 172 and in the bearing bushing 176 is a transverse motion-transmitting plunger 194, the lower portion of which is flattened as at 196 to be engaged by a set screw 198 for preventing rotation of the plunger 194. The lower end of the plunger 194 is provided with a 45° bevelled surface 200 which is engaged by the ball 158, whereas the upper end 202 of the plunger 194 is flat and engaged by the rounded lower end of the reciprocable dial indicator plunger 204 reciprocably mounted within the tubular stem 186. The axis of the plunger 194 is disposed perpendicular to the common axis of the motion-transmitting rods 112, 146 and 150. The dial indicator plunger 204 is connected by conventional motion-transmitting mechanism (not shown) to the rotary shaft 206 of the pointer or needle 208 which registers with the graduated dial 210 of the dial indicator 14. The graduations of the dial 210 are ordinarily in thousandths of an inch, but other suitable graduations, such as metric graduations, are available. As the dial indicator 14 is conventional, its details are beyond the scope of the present invention and such dial indicators are well known to those skilled in the mechanical arts and are available upon the open market.

In the operation of the bore concentricity gauge 10 of FIGURES 1 to 5 inclusive, to measure the concentricity of the small-diameter bore 44 relatively to the bore 34 in FIGURE 1, let it be assumed that the instrument is set in the position of FIGURE 4 with the measuring head 96 in its outer position. To set the measuring head 96 in the inner or more nearly central position of FIGURE 1 the operator grasps the tubular gauge mount 18 in one hand while he pushes radially outward upon the pin 78 to withdraw the nose 76 of the indexing plunger 74 from the socket 64 in which it may be momentarily seated. With the stem 88 thus released, the operator rotates the barrel or handle 124 until the socket 66 arrives opposite the end 76 of the plunger 74, whereupon he releases the pin 78 so that the spring 80 forces the end 76 of the plunger 74 into the socket 66 and locks the measuring head 96 in its retracted position of FIGURE 1.

By means of a suitable adapter sleeve or bushing 28 with its reduced diameter portion 30 inserted in the bore 34 in the supporting structure 36, the operator inserts the reduced diameter portion or pilot portion 20 of the gauge mount 18 in the bore 38 of the adapter sleeve or fixture 28 and pushes the forward end of the bore concentricity gauge 10, including the measuring head 96, through the bore 38 in the fixture 28 and into the workpiece bore 44 to be gauged for concentricity relatively to the fixture bore 34 and adapter bore 38. To do this, the operator rotates the gauge mount 16 by turning its knurled enlarged diameter portion 18 with one hand while holding the handle 168 stationary with the other hand, thereby causing the stem 28 to rotate because of its locked connection to the gauge mount 16 through the locking pin 74. This in turn causes the rounded end 100 of the measuring pin 90 to trace out an annular path around the surface of the bore 44. If concentricity between the bores 44 and 38 exists, the dial indicator pointer 208 does not move off its "zero" point on the scale graduations 210. If, on the other hand, deviation from concentricity exists, the pointer 208 swings back and forth relatively to the zero point of the dial indicator scale graduations 210, such deviation indicating a departure from concentricity.

The transverse motion of the measuring pin 90 resulting from such deviation, by the point-to-point engagement of its sharp edge 106 with the conical end 110 of the outer or forward motion-transmitting rod 112 shifts the rods 112, 124 and 150 longitudinally, together with the ball 158. The longitudinal motion of the ball 158 against the bevelled end surface 200 of the plunger 194 shifts the plunger 194 and dial indicator plunger 204 transversely. The motion-transmitting mechanism within the dial indicator 14 converts this motion into rotary motion of the pointer shaft 206 and pointer 208. The operator then withdraws the instrument 10 from the bores 44 and 34, assuming that he is retaining the adapter sleeve 28 on the pilot portion 20 of the gauge mount 16.

To measure the concentricity of the large diameter bore 212 in the workpiece W' of FIGURE 4 relatively to the bore 34 in the supporting fixture 36, assuming the measuring head 96 to be in its more nearly centric position of FIGURE 1, with the reduced diameter portion 20 of the gauge mount 16 inserted in the adapter sleeve or fixture 28, the operator inserts the assembly by pushing the adapter sleeve 28 again through the bore 34 in the supporting structure 36, as stated above in connection with FIGURE 1. When the gauge mount 16 and adapter sleeve 28 have reached their fully seated positions shown in FIGURES 1 and 4, the operator by again pushing radially outward on the pin 78 unlocks the plunger 74 from the socket 66 and rotates the tubular barrel 124 and stem 88 and measuring head 96 from the position shown in FIGURE 1 to that of FIGURE 4. He then releases the pin 78 and plunger 74 to permit the spring 80 to push the plunger nose 76 into the socket 64 of the indexing collar 58, locking the latter and the stem 88 and measuring head 96 in the position shown in FIGURE 4. The instrument is then manipulated in the manner described above by holding the handle 168 in one hand and turning the knurled portion 18 of the gauge mount 16 in the other hand so as to cause the rounded end 102 of the measuring pin 90 to trace out an arcuate or annular path on the surface of the bore 212. Any deviation from the concentricity of the bore 212 relatively to the bore 38 immediately shows up as before by a swinging to and fro of the pointer 208 on the dial indicator 14.

To withdraw the measuring head 96 from the large diameter bore 212 and through the supporting structure bore 34, the operator reverses the above-described procedure to swing the measuring head 96 from its outer position of FIGURE 4 to its inner position of FIGURE 2. The withdrawal of the forward portion of the instrument can then be accomplished without danger of damaging the measuring head 96 by collision with the supporting structure 36.

*Multi-Diameter Bore Concentricity Gauge*

The modified bore concentricity gauge, generally designated 220, shown in FIGURES 6, 7 and 8 is identical in construction with the bore concentricity gauge 10 of FIGURES 1 to 5 inclusive, except for the construction of its measuring head 222 and indexing collar 224. The latter, instead of having two sockets 64 and 66 as in FIGURES 1 to 5 inclusive, has four sockets 226, 228, 230 and 232 respectively, giving four different positions in which the measuring head 222 may be locked. Otherwise, the indexing collar 224 and its adjacent locking mechanism is the same as that shown in FIGURES 1 to 4 inclusive and hence requires no further discussion.

In order to provide four measurement positions, the modified measuring head 224 has a body 234 of lopsided T-shaped cross-section (FIGURE 6) with crossed bores 236 and 238 disposed with their axes at right angles to one another. Mounted in the opposite ends of these bores are four round-ended measuring pins 240, 242, 244 and 246 of progressively increasing lengths operatively connected to one another in any suitable way. One such way, shown in FIGURES 7 and 8, includes a central ring 248 having a sharp-edged inner bore 250 adapted to be engaged by the conical end 110 of the outer motion-transmitting rod 112 shown in FIGURES 1 to 4 inclusive and reciprocable as before in the bore 92 of the stem 88. The ring 248 is drilled at 95° intervals to receive inner pivot pins 252 also pivotally engaging the correspondingly-drilled inner ends of four motion-transmitting links 254. The outer ends of the motion-transmitting links 254 and the four measuring pins 240, 242, 244 and 246 are similarly drilled to receive outer pivot pins 256 coupling the links 254 to the above-mentioned measuring pins.

The operation of the modified multi-diameter bore concentricity gauge 220 of FIGURES 6 to 8 inclusive is similar to that described above for the bore concentricity gauge 10 of FIGURES 1 to 5 inclusive, except that the measuring head 222 is shifted to any one of its four positions by engaging the nose portion 76 of the locking plunger 74 with the socket 226, 228, 230 or 232 corresponding to the position of the measuring head 222 in which it is desired to take measurements. This in turn depends on the diameter of the bore to be measured for concentricity, four such bores or ranges of bores being capable of such measurement.

With the approximately T-shaped measuring head 222 set in the desired position, the rounded end of one of the four measuring pins 240, 242, 244 or 246 engages the bore to be measured. The measuring head 222 is again turned through an arcuate or annular path by rotating the knurled portion 18 of the gauge mount 16, any deviation from concentricity being shown by the motion of the pointer 208 upon the dial indicator 14. Motion is transmitted from the selected measuring pin 240, 242, 244 or 246 through its respective link 254 and pivots 256 and 252 to the central ring 248, the sharp-edged bore 250 of which engages the conical end 110 of the motion-transmitting rod 112 in point-to-point engagement to shift the latter and transmit the motion to the dial indicator 14.

*Axially-Extensible Bore Concentricity Gauge*

The further modified axially-extensible bore concentricity gauge, generally designated 310, shown in FIGURES 9 and 10 provides for axially extending the measuring head 96 relatively to the gauge mount 16 and indexing it in such axially-varied positions, as well as rotating it to different circumferential positions and indexing it in such positions. A comparison of the further modified gauge 260 of FIGURES 9 and 10 with the gauge 10 of FIGURES 1 to 5 inclusive shows that the forward and rearward portions or thirds of the gauges 10 and 310 are substantially the same in constructon, but that the construction differs in the intermediate portion or central third of the gauge 310 from that in the corresponding portion of the gauge 10. Accordingly, the same reference numerals are used for corresponding parts in the forward and rearward portions of the gauges 10 and 310, and only such new numerals are employed in the intermediate portion of the gauge 310 where it differs from the construction of the intermediate gauge 10. Certain other numerals of similar but somewhat modified parts have been designated with the same reference numerals as used in FIGURE 1, increased by 300, to show the relationship.

In the axially-extensible bore concentricity gauge 310, the forward portion of the stepped sleeve 322 has been lengthened and the tubular barrel 324 has been provided with a reduced diameter forward portion 326 which extends beneath the gauge mount 16 into the bore 48 thereof and is provided with two axially-spaced sets of diametrically-opposite indexing holes or recesses 364, 366 and 368, 370 respectively. A helical compression spring 372 engaging the annular shoulder 54 at its forward end, engages an annular shoulder 374 in a counterbore 376 within the smaller diameter bore 378 inside the barrel 324, and urges the barrel 324 and gauge mount 16 away from one another in opposite directions. As before, the large diameter portion 18 of the gauge mount 16 is drilled radially to receive the locking plunger 74 with its nose portion 76 and operating handle 78 projecting through the side wall slot 70. The coil spring 80, however, in FIGURE 9 urges the nose portion 76 of the locking plunger 74 into engagement with either of the pairs of diametrically-opposite sockets 364, 366 or 368, 370 as described below in connection with the operation of the invention.

In the operation of the axial-extensible bore concentricity gauge 310, the general procedure is the same as that described above in connection with the bore concentricity gauge 10 of FIGURE 1, as to the measurement of bores of a small or large diameter in approximately the same plane of measurement. Thus, by retracting the plunger 74 by means of its handle 78, either of the diametrically opposite sockets 364 or 366 can be engaged and locked by the nose portion 76 of the locking plunger 74 as in the case of the sockets 64 and 66 in the indexing collar 58 of FIGURE 1, which the extension 326 of the barrel 324 replaces.

To extend the measuring head 96 axially, relatively to the gauge mount 16, however, in order to move it from the large diameter measuring position of FIGURE 10 in the bore 380, to the stepped smaller diameter position of FIGURE 9, in bore 382, the operator while grasping the gauge mount 16 in one hand and the barrel 324 in the other, operates the handle 78 with one finger to withdraw it from the forward bore 368 or 370, pushes his hands toward one another so as to cause the reduced diameter forward portion or extension 326 of the barrel 324 to move further into the bore 48 within the enlarged diameter portion 18 of the gauge mount 16. He then releases the handle 78 and moves the barrel 324 both circumferentially and axially relatively to the gauge mount 16 until the nose portion 76 of the locking plunger 74 comes to rest in the desired one of the sockets 364 or 366. In this manner, the stem 88 and measuring head 96 are retracted from their extended positions of FIGURE 9 to their retracted positions of FIGURE 10. Since there are two diametrically-opposite sockets 364, 366 and 368, 370 in two different axial positions of the measuring head 96 and stem 88, it is still convenient to measure bore concentricity in two different positions of small and large diameter bores in each of the axial positions of the measuring head 96 relatively to the gauge mount 16, following the procedure described in connection with the operation of the bore concentricity gauge of FIGURES 1 to 5 inclusive.

What I claim is:

1. A bore concentricity gauge for measuring the concentricity of a workpiece bore relatively to a reference bore, said gauge comprising a gauge mount having an external reference surface adapted to snugly but removably fit the reference bore in coaxial relationship therewith and having a mounting bore therethrough with its axis disposed in eccentric parallel relationship to the axis of said reference surface, an elongated hollow stem structure rotatably mounted in said mounting bore and having a forward end portion projecting therebeyond, said forward end portion having transverse bore means therein disposed substantially perpendicular to said mounting bore, a bore-measuring device reciprocably mounted in said transverse bore means and having feeler portions on the opposite ends thereof adapted selectively to engage the workpece bore alternately, means for selectively locking said stem structure to said gauge mount in a selected one of a plurality of positions of rotation relatively to said gauge mount effecting presentation of the selected feeler portion to the workpiece bore, a normally stationary handle structure rotatably receiving the rearward portion of said stem structure, a dial indicator mounted on said handle structure, and motion-transmitting mechanism extending from said measuring device through said stem structure and handle structure to said dial indicator and responsive to the transverse shifting of said measuring device by the engagement of the selected feeler portion with a non-concentric work-piece bore during rotation of said gauge mount relatively to the reference bore to actuate the dial indicator to effect a bore concentricity measurement indication thereon.

2. A bore concentricity gauge, according to claim 1 wherein said forward end portion of said stem structure includes a measuring head offset laterally relatively to the portion of said stem structure within said mounting bore.

3. A bore concentricity gauge, according to claim 1, wherein said measuring device includes a measuring member having opposite feeler end portions of different lengths adapted to project outward from said transverse bore means and having an intermediate portion therebetween operatively engaging said motion-transmitting mechanism.

4. A bore concentricity gauge, according to claim 1, wherein said locking means includes circumferentially-spaced keeper portions on said stem structure corresponding in circumferential locations to said feeler portion and wherein said locking means also includes a locking element connected to said gauge mount and movable selectively into and out of locking engagement with a selected keeper portion moved into alignment therewith by rotation of said stem structure relatively to said gauge mount.

5. A bore concentricity gauge, according to claim 4, wherein said gauge mount has a transverse bore therein and wherein said locking element comprises a locking plunger reciprocably mounted in said transverse gauge mount bore.

6. A bore concentricity gauge, according to claim 1, wherein said gauge mount has a reduced diameter portion provided with said reference surface and a hollow enlarged diameter portion containing said locking means.

7. A bore concentricity gauge, according to claim 6, wherein said locking means includes a rotary keeper body mounted on said stem structure within said hollow gauge mount portion, said body having circumferentially-spaced keeper portions thereon corresponding in circumferential locations to said feeler portions and wherein said locking means also includes a locking element connected to said gauge mount and movable selectively into and out of locking engagement with a selected keeper portion moved into alignment therewith by rotation of said stem structure relatively to said gauge mount.

8. A bore concentricity gauge, according to claim 6, wherein said stem structure has a tubular extension on the rearward end thereof and wherein said handle structure has a forward portion received within said extension.

9. A bore concentricity gauge, according to claim 1, wherein said transverse bore means includes a plurality of transverse bores with their axes disposed in circumferentially-spaced relationship, wherein said bore measuring device includes a plurality of measuring members of different lengths reciprocably mounted in said transverse bores and also includes a coupling arrangement operatively interconnecting said measuring members and operatively engaging said motion-transmitting mechanism.

10. A bore concentricity gauge, according to claim 9, wherein said coupling arrangement operatively engages the inner ends of said measuring members for motion responsively thereto.

11. A bore concentricity gauge, according to claim 1, wherein said stem structure is slidably mounted in said mounting bore for longitudinal motion relatively thereto, and wherein said locking means includes a keeper body movable axially relatively to said stem structure and connected to said handle structure, wherein said keeper body has axially-spaced keeper portions disposed therealong, and wherein said locking means also includes a locking element connected to said gauge mount and movable selectively into and out of locking engagement with a selected keeper portion of said axially-spaced keeper portions moved axially into alignment therewith.

12. A bore concentricity gauge, according to claim 11, wherein said keeper body also has circumferentially-spaced keeper portions disposed therearound and wherein said locking element is also movable selectively into and out of engagement with a selected keeper portion of said circumferentially-spaced keeper portions moved circumferentially into alignment therewith.

References Cited in the file of this patent

UNITED STATES PATENTS

| | | |
|---|---|---|
| 781,523 | Humpage | Jan. 31, 1905 |
| 963,559 | Hines | July 5, 1910 |
| 1,695,453 | Carptenter | Dec. 18, 1928 |
| 2,883,758 | Zelnick | Apr. 28, 1959 |
| 2,884,699 | Eisele | May 5, 1959 |